United States Patent [19]

Matteucci et al.

[11] Patent Number: 4,536,998
[45] Date of Patent: Aug. 27, 1985

[54] FLEXIBLE SELECTIVE ENERGY CONTROL SHEET AND ASSEMBLY USING THE SAME

[75] Inventors: John S. Matteucci, Healdsburg; James K. Snyder; Robert E. Hahn, both of Santa Rosa, all of Calif.

[73] Assignee: Optical Coating Laboratory, Inc., Santa Rosa, Calif.

[21] Appl. No.: 594,927

[22] Filed: Mar. 29, 1984

Related U.S. Application Data

[62] Division of Ser. No. 308,025, Oct. 2, 1981, Pat. No. 4,463,047.

[51] Int. Cl.$^3$ ............................................. E06B 7/12
[52] U.S. Cl. .................................... 52/171; 428/216; 52/202
[58] Field of Search ................... 52/171, 789, 202; 428/666, 626, 926, 458, 457, 658, 668, 333, 671, 674, 432; 350/1.7

[56] References Cited

U.S. PATENT DOCUMENTS

| | | | |
|---|---|---|---|
| 4,017,661 | 4/1977 | Gillery | 428/412 |
| 4,166,876 | 9/1979 | Chiba | 428/215 |
| 4,247,599 | 1/1981 | Hopper | 428/458 |
| 4,335,166 | 6/1982 | Lizardo | 52/789 |

FOREIGN PATENT DOCUMENTS

| | | | |
|---|---|---|---|
| 2461716 | 12/1974 | Fed. Rep. of Germany | 52/789 |
| 2703688 | 8/1978 | Fed. Rep. of Germany | 52/171 |
| 1013630 | 12/1965 | United Kingdom | 52/171 |

Primary Examiner—John E. Murtagh
Assistant Examiner—Kathryn L. Ford
Attorney, Agent, or Firm—Flehr, Hohbach, Test, Albritton & Herbert

[57] ABSTRACT

Flexible selective energy control sheet construction formed of a sheet of substantially transparent polymer thin film plastic material having first and second surfaces. A substantially transparent continuous adhesion promoting layer is adherent to the second surface of the sheet. A substantially transparent metal layer is adherent to the adhesion promoting layer and a protective layer is adherent to the metal layer. The metal layer is selected from the materials of copper and silver.

11 Claims, 10 Drawing Figures

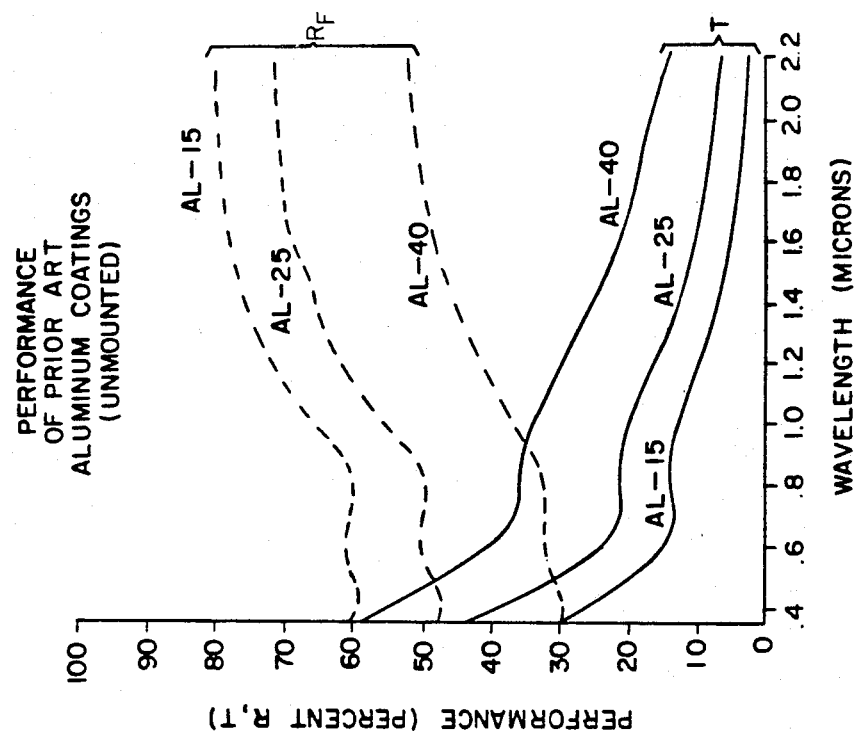
FIG.—3
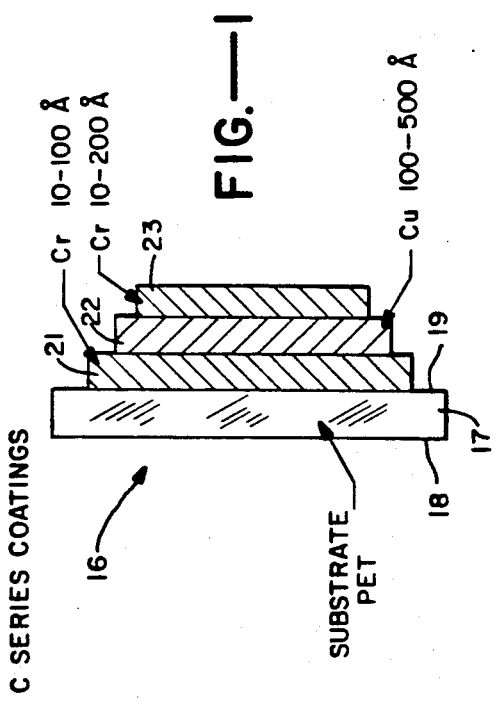
FIG.—1
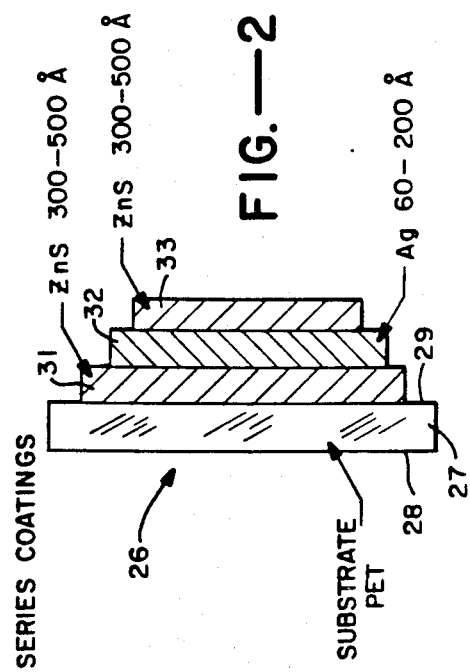
FIG.—2

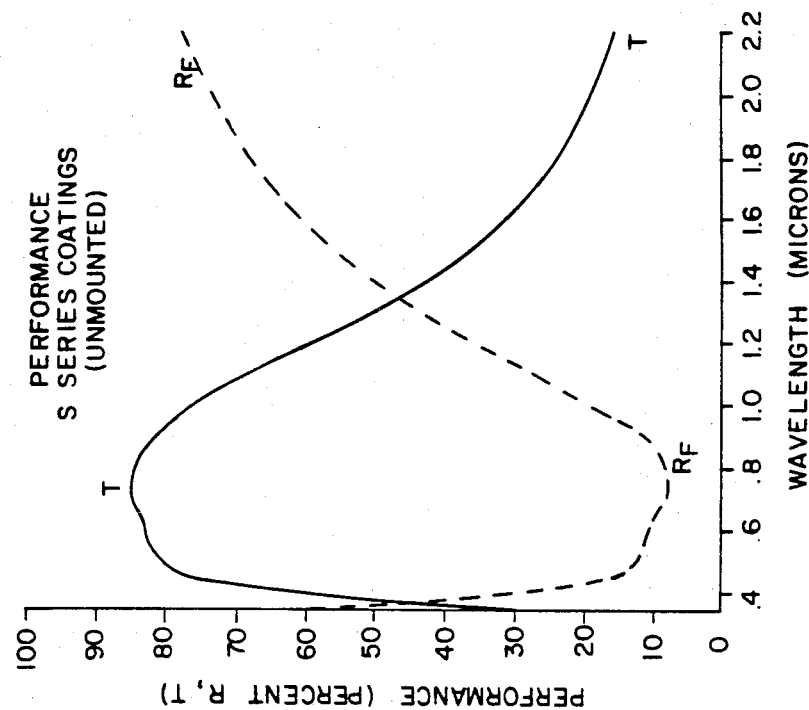
FIG.—5
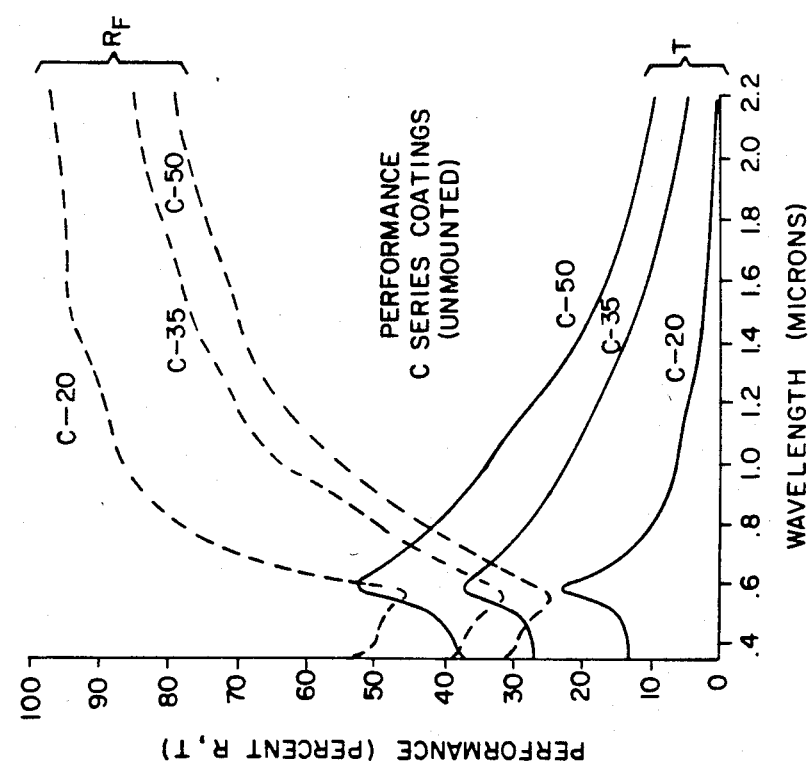
FIG.—4

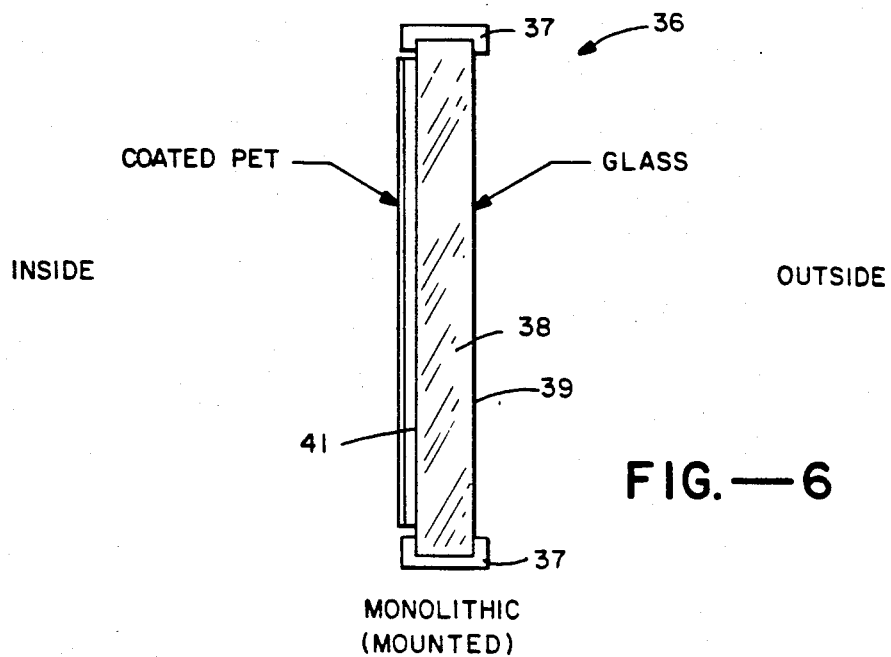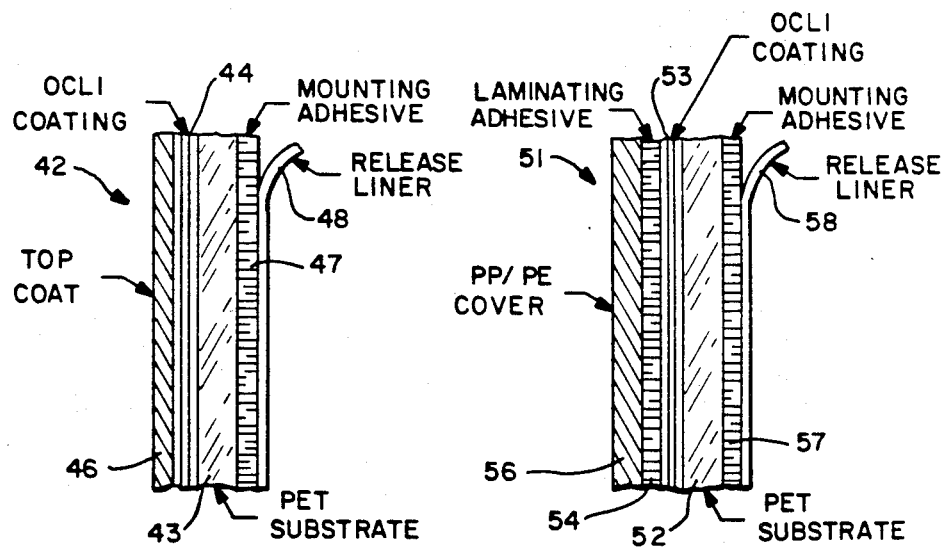

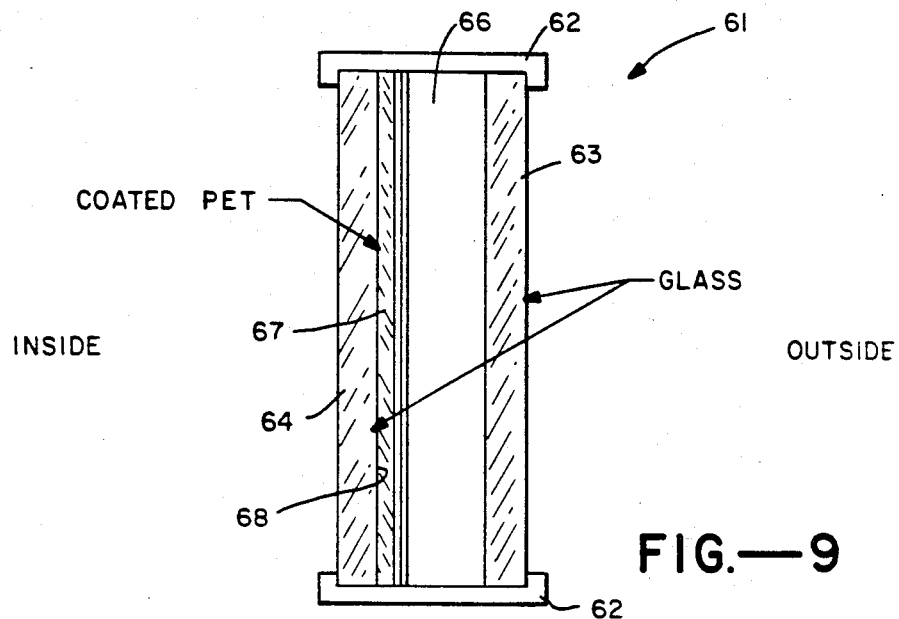
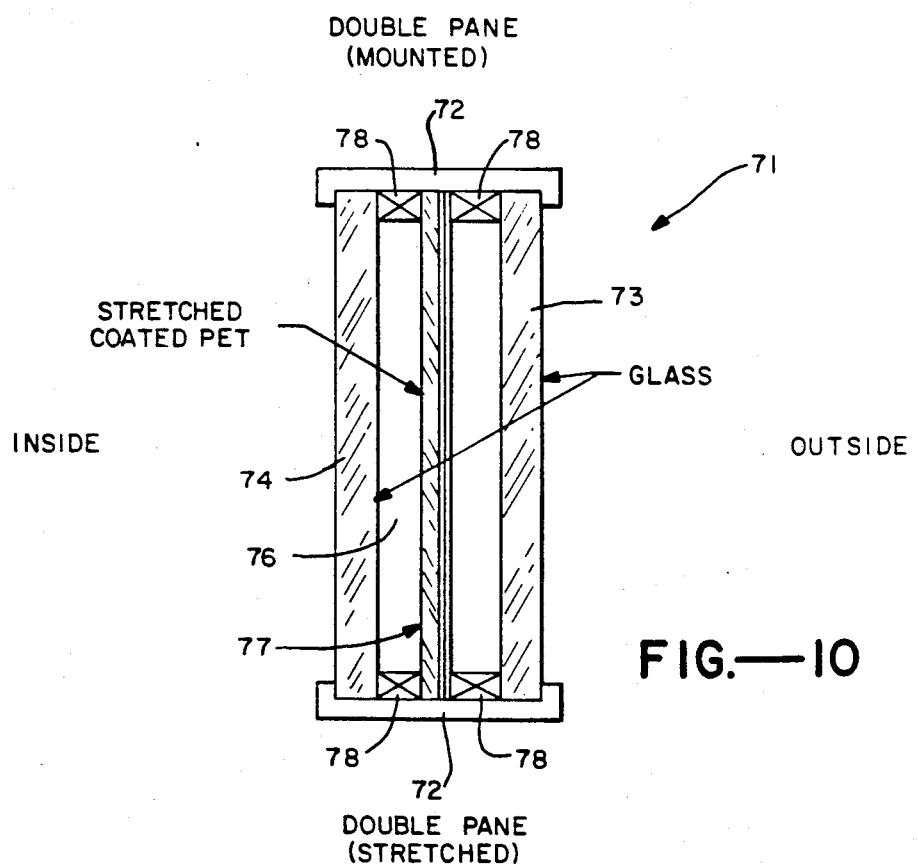

FLEXIBLE SELECTIVE ENERGY CONTROL SHEET AND ASSEMBLY USING THE SAME

This is a division, of application Ser. No. 308,025 filed on Oct. 2, 1981 now U.S. Pat. No. 4,463,047.

This invention relates to flexible energy control sheets and assembly using the same and more particularly to such sheets and assemblies thereof in which improved visual transmission is obtained while at the same time making it possible to select the thermal performance.

Energy control sheets for use on windows have heretofore been commercially available in the marketplace. Typically this product has consisted of an aluminum layer formed on plastic sheeting. Aluminum in such applications has the capability of providing substantially the same transmittance in the visual region as it does in the solar region thereby limiting the solar reflectance as a function of visual transmission. Typical aluminum films in the marketplace are approximately 15 to 20 percent transmitting and have a good thermal performance. There is a need for a new and improved energy control sheet which has improved visual transmission characteristics while retaining and improving the thermal performance of the sheeting. In addition, aluminum coated films have been found to be relatively non-durable and therefore there is a need to provide a more durable energy control sheet.

In general, it is an object of the present invention to provide a flexible selective energy control sheet and assembly thereof which has improved visual transmission characteristics and good thermal properties.

Another object of the invention is to provide an energy control sheet and assembly thereof of the above character in which the transmission which is obtained is substantially greater than that which can be obtained with the use of aluminum and which has thermal properties which is substantially as good as that of aluminum.

Another object of the invention is to provide an energy control sheet and assembly thereof of the above character which is relatively durable.

Another object of the invention is to provide an energy control sheet and assembly thereof the above character which is aesthetically pleasing.

Another object of the invention is to provide an energy control sheet and assembly using the same of the above character in various colorations can be obtained.

Another object of the invention is to provide an energy control sheet and assembly using the same of the above character in which the energy control sheet can be prepared in a vacuum deposition roll coater.

Another object of the invention is to provide an energy control sheet and assembly using the same of the above character in which the thermal control properties can be selected.

Another object of the invention is to provide a selective energy control sheet and assembly using the same of the above character which is particularly adapted for colder climates; for example, the northerly latitudes in the northern hemisphere.

Another object of the invention is to provide an energy control sheet and assembly thereof using the same of the above character which is particularly adapted for warmer climates; for example, the southern latitudes in the northern hemisphere.

Additional objects and features of the invention will appear from the following description in which the preferred embodiments are set forth in detail in conjunction with the accompanying drawings.

FIG. 1 is a cross-sectional view of a flexible selective energy control sheet incorporating the present invention utilizing copper.

FIG. 2 is a cross-sectional view of an energy control sheet incorporating the present invention utilizing silver.

FIG. 3 is a graph showing the performance of prior art unmounted energy control sheets using aluminum.

FIG. 4 is a graph showing the performance of unmounted energy control sheets of the present invention using copper.

FIG. 5 is a graph showing the performance of unmounted energy control sheets of the present invention using silver.

FIG. 6 is a cross-sectional view of an assembly using a flexible selective energy control sheet in which the sheet is mounted on existing architectural glass for use in retrofit situations.

FIG. 7 is a cross-sectional view of a top coated form of energy control sheet for use in the embodiment shown in FIG. 6.

FIG. 8 is a cross-sectional view of a laminate form of energy control sheet for use in the embodiment of the invention shown in FIG. 6.

FIG. 9 is a cross-sectional view of an assembly utilizing an energy control sheet mounted on one surface of the two panes of glass in a double pane construction producible by original equipment manufacturers.

FIG. 10 is a cross-sectional view showing an assembly utilizing an energy control sheet of the present invention in which the energy control sheet is stretched between a double pane construction producible by original equipment manufacturers.

In general, the flexible energy control sheet of the present invention comprises a sheet of substantially transparent flexibile polymer thin film plastic material. It has a thickness ranging from 12 micrometers to 200 micrometers and having first and second surfaces. A substantially transparent substantially continuous adhension promoting layer is adherent to the second surface of the sheet. A substantially transparent metal layer is adherent to the adhesion promoting layer. A protective layer is adherent to the metal layer. The metal layer is selected to provide the desired thermal characteristics while providing improved transmission. For more northerly climates in the northern hemisphere, a silver-based film is provided. For the more southerly climates in the northern hemisphere, a copper-based film is provided.

In FIG. 1, there is shown a copper series (C series) or a copper based energy control sheet. As shown therein, the energy control sheet 16 consists of a layer 17 which serves as a substrate and has a thickness ranging from two to 200 micrometers and with a typical thickness ranging from 12 to 25 micrometers. The layer 17 should be substantially transparent. It is formed of a flexible polymer thin film plastic material of a suitable type such as polyethylene terephthalate. Other possible substitute materials are polypropylene, polyethylene, acrylic and other like polymer substances. The layer 17 is provided with first and second surfaces 18 and 19. An adhesion promoting layer 21 is adherent to the second surface 19 and serves as a bonding layer for a metal layer 22. The adhesion promoting layer 21 should be substantially transparent and should be sufficiently thick so as to provide a substantially continuous layer for the metal layer 22. In addition, it must be thin enough so as not to adversely interfere with the transmission qualities of the optical properties of the resulting energy control sheet 16. By way of example, the adhesive layer 21 could have a thickness of approximately 20 Angstroms but could range from 10 to 100 Angstroms in thickness. One material found to be suitable for this application is chromium in a thickness of approximately 20 Angstroms. Chromium was selected for this adhesion promoting layer 21 because it has excellent properties from the standpoint of its durability at various temperature environments. Also it has excellent adhesive qualities.

When the energy control sheet 16 is to be utilized in the southern latitudes of the northern hemisphere, copper is used for the metal layer. The copper layer 22 is applied to a thickness which is consistent with the desired resultant transmission level as well as the desired color. For example, the thickness of the copper layer can range from 100 to 500 Angstroms with a typical copper layer having a thickness of 150 Angstroms.

A protective layer 23 is adherent to the metal layer 22. The layer 23 serves to prevent oxidation and corrosion of the metal layer 22. One metal found to be particularly suitable for this purpose was chromium which can be deposited to a thickness of 10 to 200 Angstroms and at preferably a thickness of approximately 40 Angstroms for this layer 23.

In FIG. 2 there is shown an energy control sheet 26 which is of an S-series or silver-based type. As shown in FIG. 2, such an energy control sheet 26 consists of the layer 27 of a substantially transparent flexible polymer thin film of plastic material of the type hereinbefore described in conjunction with FIG. 2. It is provided with front and rear surfaces 28 and 29. An adhesion promoting layer 31 is adherent to the second surface 29 and serves as a bonding layer for a metal layer 32. The adhesion promoting layer 31 can be formed of suitable material such as zinc sulfide and can have a suitable thickness ranging from 300 to 500 Angstroms with a preferable thickness of approximately 400 Angstroms. The metal layer 32 can be formed of a suitable material such as silver having a thickness ranging from 60 to 200 Angstroms and preferably a thickness of approximately 125 Angstroms. It should be pointed out that the adhesion promoting layer 31 serves as a nucleating layer as well as an optical layer for the silver layer 32. A protective layer 33 is formed on the metal layer 32 and serves to prevent oxidation of the silver layer 32 as well as to physically protect the silver layer from abrasion. The protective layer 33 can be formed of a suitable material such as zinc sulfide having a thickness ranging from 300 to 500 Angstroms with a preferable thickness being in the vicinity of 400 Angstroms. This layer is also optically active.

As hereinafter can be seen, the C-series or copper-based energy control sheets are particularly useful in what may be termed as summer conditions or in other words would be particularly useful in southern latitudes of the northern hemisphere whereas the S-series or silver based designs are particularly useful for the northern latitudes of the northern hemisphere where optimum solar energy transmission and infrared rejection is the requirement.

The optical properties which are usually used as figures of merit are the ratio of visually transmitted energy to solar isolation ($T_{vis}/T_{solar}$) and the infrared emittance ($\epsilon_f$). Other properties such as transmittance and reflectance measured over the solar spectrum are used to calculate shading coefficient (SC), U-factor and fraction of solar energy rejected or retained. Typical spectra showing the performance of unmounted prior art aluminum coatings is shown in FIG. 3. Typical spectra are shown in FIG. 4 for unmounted energy control sheets of the present invention using copper. Typical spectra are shown in FIG. 5 for unmounted energy control sheets of the present invention using silver. Table No. 1 set forth below shows the performance data for FIGS. 3, 4 and 5.

TABLE I

| | WINDOW FILM COATINGS (UNMOUNTED) | | | | | | | |
|---|---|---|---|---|---|---|---|---|
| | VISUAL | | | SOLAR | | | | |
| Design | $T_v$ | $R_f$ | $R_b$ | $T_s$ | $R_f$ | $R_b$ | $T_{vis}/T_{solar}$ | $\epsilon_f$ |
| C-20 | .20 | .50 | .40 | .12 | .71 | .65 | 1.65 | .05 |
| C-35 | .34 | .34 | .19 | .27 | .50 | .38 | 1.25 | .10 |
| C-50 | .48 | .27 | .14 | .39 | .42 | .32 | 1.23 | .13 |
| S-80 | .82 | .12 | .14 | .73 | .20 | .20 | 1.20 | .10 |
| AL-15 | .17 | .61 | .60 | .15 | .64 | .62 | 1.13 | .33 |
| AL-25 | .27 | .50 | .48 | .23 | .53 | .51 | 1.17 | .40 |
| AL-40 | .43 | .32 | .30 | .38 | .35 | .33 | 1.13 | .50 |

In the above design, the C-20, C-35 and C-50 curves are for copper based coatings whereas the S-80 curve is for a silver-based coating. The AL-15, AL-25 and the AL-40 curves are for aluminum based commercially available coatings that constitute prior art.

The following optical and thermal definitions have been used in connection with the graphs and FIGS. 3, 4 and 5 and in Table I above.

Visual-ILL"B"

$T_v(\%)$ = Percent Visual Transmittance The overall percent transmittance over the visual wavelength range (0.4–0.7 μm) weighted against Illuminant "B" which approximates noonday sun conditions.

$R_b(\%)$ = The Overall Percent Reflectance, Back The overall percent reflectance measured from the "uncoated" side over the visual wavelength range (0.4–0.7 μm) weighted against Illuminant "B" which approximates noonday sun conditions.

$R_f(\%)$ = The Overall Percent Reflectance, Front The overall percent reflectance measured from the coated surface over the visual wavelength (0.4–0.7 μm) weighted against Illuminant "B" which approximates noonday sun conditions.

Solar AM$_2$ $T_s(\%)$ = Percent Solar Transmittance The overall percent transmittance over the wavelength range 0.25–2.2 m weighted against Moon's AM$_2$ solar curve.

$R_b(\%)$ = Percent Reflectance, Back The overall percent reflectance measured from the "uncoated" side over the wavelength range 0.35–2.2μ weighted against Moon's AM$_2$ solar curve.

$R_f(\%)$ = Percent Reflectance, Front The overall percent reflectance measured from the coated surface over the wavelength range 0.35–2.2 μm weighted against Moon's AM$_2$ solar curve.

Thermal $T_v/T_s$ = Selectivity Ratio

The ratio of visual transmittance to solar transmittance being a merit function of visibility through the film compared to solar energy transmitted.

ϵf=Emittance Front The hemispherical thermal emittance of the film measured from the surface at approximately 30° C.

The curves shown in FIGS. 3, 4 and 5 are for transmittance and reflectance. The solid lines are transmission curves and are labeled T whereas the broken lines are reflectance curves and are labeled R. A comparison of the curves shown in FIGS. 4 and 5 with respect to the curves shown in FIG. 3 shows the dramatic improvement in performance of the coatings of the present invention over that which can be obtained with aluminum. The selectivity and environmental performance are superior to the prior art aluminum coated designs. Greatly improved visual transmittance can be obtained with the same solar rejection with the energy control sheets of the present invention in comparision to the prior art aluminum based energy control sheets. The energy control sheets of the present invention also give greater spectral selectivity between the solar/visual and far infrared regions.

More specifically from FIG. 4, it can be seen that the transmission peaks at approximately six-tenths of a micron and then gradually drops off through the visible region with the transmittance diminishing in the infrared region. This shows the desirable transmission characteristic for the film and shows the selectivity of the coating versus the prior art aluminum based coatings shown in FIG. 3 which have no such peaking of transmittance in the visible region. As shown in FIG. 3, in the prior art aluminum based coatings, the transmission does not peak but has a value of at 0.6 microns associated with the identity for the coating as for example the AL-40 coating has a transmittance of 40% at 0.6 microns. The transmittance thereafter decreases slowly in the long infrared region.

With respect to the silver based coatings shown in FIG. 5, it can be seen that the transmission again peaks at approximately 0.6 microns and is substantially flat throughout the visible region and thereafter decreases in the infrared region. Again this coating has very desirable characteristics particularly when compared to the prior art aluminum based coatings shown in FIG. 3.

The advantage of the coatings of the present invention is that they have high solar transmission and are substantially colorless to the eye. In addition, they have an added important characteristic which is a consistent reflectance value below 20% which makes the coating pleasing from a reflectance standpoint.

Products made in accordance with the present invention can also be produced to have color. Thus for example the C-50 product shown in FIG. 4 would have a neutral color by reflection. It also provides a bronze tint in transmitted energy as well.

The designs which have hereinbefore been set forth with respect to copper and silver as the base are of the type which can be produced with vacuum roll coating equipment capable of simultaneous high rate deposition of multi-layer coatings consisting of more than one evaporant. The coatings for the energy control sheets of the present invention have been specifically designed to selectively enhance the transmission of semi-transparent metals by the application of multi-layer thin film interference techniques.

In FIG. 6 there is shown an assembly 36 using an energy control sheet. The assembly 36 is of a type which would be used in retrofit applications. The assembly 36 consists of a conventional frame 37 in which there is mounted a pane 38 of glass of a suitable thickness as for example one-eighth of an inch. The pane 38 of glass is provided with an outside surface 39 and an inside surface 41. An energy control sheet is mounted on the inside surface 41. The energy control sheet can be of the type shown in FIGS. 7 and 8.

The energy control sheet 42 as shown in FIG. 7 consists of a plastic substrate 43 of the type hereinbefore described which carries a C-series or S-Series type coating 44 formed of at least three layers. This coating 44 is covered with a protective top coat 46 of a suitable material such as a polymeric or organic film or coating of a thickness ranging from 5–50 microns. The top coat 46 serves as a protective top coat for the underlying three-layer coating 44. The other side of the substrate 43 is provided with a layer 47 of a conventional suitable mounting adhesive such as a pressure sensitive adhesive. A conventional release liner 48 overlies the mounting adhesive 47 and serves to protect the adhesive. When it is desired to place an energy control sheet 42 on the inside surface of an existing pane of glass, the release liner 48 can be peeled away and the energy control sheet mounted on the inside surface 41 of the pane 38. The mounting adhesive 47 will hold the energy control sheet in place. The top coat 46 protects the coating 44 so that the inside surface of the window can be washed to keep it clean.

Another energy control sheet 51 of the type which can be utilized in retrofit applications is shown in FIG. 8. It consists of a plastic substrate 52 on which there is deposited a three layer coating 53. A conventional laminating adhesive 54 is applied to the coating 53. A cover 56 is carried by the adhesive layer 54. The cover 56 can be of a suitable type such as of polypropylene or polyethylene.

A conventional mounting adhesive layer 57 is provided on the other side of the plastic substrate 52 and carries a conventional release liner 58. The energy control sheet 51 shown in FIG. 8 can be mounted on the inside surfaces of windows in the same manner as the energy control sheet 42 shown in FIG. 7.

The energy control sheets of the present invention can be also utilized by original equipment manufacturers to provide glazing assemblies on which energy control sheets of the present invention have been mounted. For example there is shown in FIG. 9 a double pane assembly 61 which includes a frame 62. Two panes 63 and 64 of glass of a suitable thickness such as one-eighth inch are mounted in the frame 62 so that they are spaced apart in parallel positions with a space 66 therebetween. An energy control sheet 67 of the present invention is mounted between the panes of glass 63 and 64. For example the energy control sheet 67 can be mounted on the inside surface 68. As described with the energy control sheets 42 and 51 shown in FIGS. 7 and 8, the energy control sheets 67 can be provided with a mounting adhesive (not shown) so that it is supported by the inside surface 68 of the pane 64.

In FIG. 10 there is shown another assembly 71 of the type which would be manufactured by an original equipment manufacturer which includes a frame 72 which has mounted therein two spaced apart parallel panes of glass 73 and 74 having a space 76 therebetween. An energy control sheet 77 of the type utilized in the present invention is disposed between the panes 73 and 74 and is stretched within the frame 72 so that is positioned in the space 76 approximately equidistant from the inside surfaces of the panes 73 and 74. Spacers 78 have been provided adjacent the outer margin of the energy control sheet 77 and the frame 72. In this way it can be seen that the energy control sheet 77 is stretched between the double pane glazing shown in FIG. 10. When this is the case, it is unnecessary to provide the mouting adhesive on the rear side of the plastic substrate for the energy control sheet 77.

In Table II set forth below are given the typical properties of window film coatings mounted to one-eighth inch plate glass.

TABLE II

TYPICAL PROPERTIES
WINDOW FILM COATINGS
(MOUNTED TO ⅛" PLATE GLASS)

| PRO-DUCT | $T_{visual}$ | $T_{solar}$ | TOTAL SOLAR REJECTED | $U_s$ | $U_w$ | SC | $\epsilon_f$ | $\frac{T_{visual}}{T_{solar}}$ |
|---|---|---|---|---|---|---|---|---|
| C-20 | .22 | .14 | .71 | .75 | .80 | .26 | .25 | 1.57 |
| C-35 | .36 | .27 | .63 | .74 | .80 | .39 | .25 | 1.33 |
| C-50 | .49 | .39 | .52 | .77 | .83 | .53 | .30 | 1.26 |
| S-80 | .81 | .65 | .31 | .69 | .80 | .78 | .25 | 1.25 |
| AL-15 | .17 | .14 | .79 | .77 | .85 | .22 | .33 | 1.21 |
| AL-25 | .27 | .22 | .70 | .82 | .89 | .32 | .40 | 1.23 |
| AL-40 | .43 | .35 | .54 | .89 | .95 | .49 | .50 | 1.23 |

From the above it can be seen that a comparison is being made between prior art aluminum based coatings and the copper and silver based coatings of the present invention. Again it can be seen that the visual transmission is substantially greater than that which is obtainable by the prior art aluminum based coatings.

From the foregoing it can be seen that there has been provided an energy control sheet and an assembly using the same in which is it possible to obtain better selectivity in thermal optical performance while at the same time obtaining higher visual transmission. Also there have been provided energy control sheets which have improved durability. When no coloring is desired, the applications would be directed towards the silver based films whereas when a bronze or subdued earthy color is desired, a copper based film would be utilized. The energy control sheets are of a type which can be utilized in retrofit situations or can be used in original equipment manufacturers' products.

In addition the energy control sheet of the present invention can be designed to accommodate different exposures on different sides of a building.

What is claimed is:

1. In an assembly of the character described, a frame, a pane of glass mounted in the frame and having inside and outside surfaces and an energy control sheet carried by the inside surface of the pane of glass, said energy control sheet comprising a sheet of substantially transparent flexible polymer thin film plastic material having first and second surfaces, an optically active substantially transparent adhesion promoting layer adherent to said second surface of said sheet, said adhesion promoting layer being substantially continuous, a substantially transparent metal layer adherent to said adhesion promoting layer and a protective layer adherent to said metal layer, said metal layer being formed of silver and having a thickness ranging from 60 to 200 Angstroms, said adhesion promoting layer and said protective layer being formed of zinc sulphide and having a thickness ranging from 300 to 500 Angstroms.

2. An assembly as in claim 1 wherein said sheet of transparent flexible polymer plastic material has a thickness ranging from 12 micrometers to 200 micrometers.

3. An assembly as in claim 1 together with a top coat carried by said protective layer.

4. In an assembly of the character described, a frame, a plane of glass mounted in the frame and having inside and outside surfaces, an energy control sheet carried by the inside surface of the pane of glass, said energy control sheet comprising a sheet of substantially transparent flexible polymer thin film plastic material having first and second surfaces, an optically active substantially transparent adhesion promoting layer adherent to said second surface of said sheet, said adhesion promoting layer being substantially continuous, a substantially transparent metal layer adherent to said adhesion promoting layer and a protective layer adherent to said metal layer, said metal layer being formed of copper having a thickness ranging from 100 to 500 Angstroms, said adhesion promoting layer and said protective layer being formed of chromium and having a thickness ranging from 10 to 200 Angstroms.

5. An assembly as in claim 4 wherein sheet of transparent flexible polymer plastic material has a thickness ranging from 12 to 200 micrometers.

6. An assembly as in claim 4 together with a top coat carried by said protective layer.

7. An assembly as in claim 6 wherein said top coat is comprised of a film having a thickness ranging from 5 to 50 microns.

8. In an assembly of the character described, a frame, first and second panes of glass carried by the frame and having a space therebetween and a selective energy control sheet disposed between the panes of glass, the selective energy control sheet comprising a sheet of substantially transparent flexible polymer thin film plastic material having first and second surfaces, an optically active substantially transparent adhesion promoting layer adherent to said second surface of said sheet, said adhesion promoting layer being substantially continuous, a substantially transparent metal layer adherent to said adhesion promoting layer and a protective layer adherent to said metal layer, said metal layer being formed of silver and having a thickness ranging from 60 to 200 Angstroms, said adhesion promoting layer and said protective layer being formed of zinc sulphide and having a thickness ranging from 300 to 500 Angstroms.

9. In an assembly of the character described, a frame, first and second panes of glass carried by the frame and having a space therebetween and a selective energy control sheet disposed between the panes of glass, the selective energy control sheet comprising a sheet of substantially transparent flexible polymer thin film plastic material having first and second surfaces, an optically active substantially transparent adhesion promoting layer adherent to said second surface of said sheet, said adhesion promoting layer being substantially continuous, a substantially transparent metal layer adherent to said adhesion promoting layer and a protective layer adherent to said metal layer, said metal layer being formed of copper having a thickness ranging from 100 to 500 Angstroms, said adhesion promoting layer and said protective layer being formed of chromium and having a thickness ranging from 10 to 200 Angstroms.

10. An assembly as in claims 8 or 9 in which the energy control sheet is adherent to a surface of said second pane of glass facing said space.

11. An assembly as in claim 8 or 9 in which the energy control sheet is disposed in said space between said panes of glass.

* * * * *